United States Patent
Byer et al.

(10) Patent No.: US 6,891,608 B2
(45) Date of Patent: May 10, 2005

(54) ALIGNING A LENS WITH RESPECT TO AN AXIS OF BEAM PROPAGATION

(75) Inventors: Mark W. Byer, Mountain View, CA (US); Derek J. Richard, Tracy, CA (US)

(73) Assignee: Lightwave Electronics Corporation, Mountain View, CA (US)

( * ) Notice: Subject to any disclaimer, the term of this patent is extended or adjusted under 35 U.S.C. 154(b) by 269 days.

(21) Appl. No.: 10/212,931

(22) Filed: Aug. 5, 2002

(65) Prior Publication Data

US 2004/0021865 A1 Feb. 5, 2004

(51) Int. Cl.[7] .............................................. G01B 11/26
(52) U.S. Cl. ...................................... 356/153; 356/399
(58) Field of Search ................................. 356/153, 399

(56) References Cited

U.S. PATENT DOCUMENTS

| | | | |
|---|---|---|---|
| 4,199,222 A | 4/1980 | Ikushima et al. | 350/96.19 |
| 4,606,603 A | 8/1986 | Cairns | 385/58 |
| 4,614,402 A | 9/1986 | Caron et al. | 350/96.21 |
| 4,666,241 A | 5/1987 | Caron | 350/96.21 |
| 4,741,590 A | 5/1988 | Caron | 350/96.21 |
| 4,741,591 A | 5/1988 | Grabbe et al. | 350/96.21 |
| 4,749,250 A * | 6/1988 | Carter | 356/153 |
| 4,925,265 A | 5/1990 | Rink et al. | 350/96.18 |
| 4,925,267 A | 5/1990 | Plummer et al. | 350/96.2 |
| 5,231,686 A | 7/1993 | Rabinovich | 385/93 |
| 5,453,606 A * | 9/1995 | Hojo | 356/153 |
| 5,588,086 A | 12/1996 | Fan | 385/138 |
| 5,671,311 A | 9/1997 | Stillie et al. | 385/89 |
| 5,700,084 A | 12/1997 | Yasukawa et al. | 362/275 |
| 5,737,349 A | 4/1998 | Gaebe | 372/237 |
| 5,857,054 A | 1/1999 | Thomas et al. | 385/134 |
| 6,210,046 B1 | 4/2001 | Rogers et al. | 385/74 |
| 6,234,688 B1 | 5/2001 | Boger et al. | 385/92 |
| 6,320,706 B1 | 11/2001 | Richard et al. | 359/822 |
| 6,366,593 B1 | 4/2002 | Richard et al. | 372/36 |

FOREIGN PATENT DOCUMENTS

| | | | |
|---|---|---|---|
| EP | 1189246 | 3/2002 | G21C/19/02 |
| EP | 1195630 | 4/2002 | G02B/6/38 |

OTHER PUBLICATIONS

Newport Corporation Website "Tutorials: Opto–Mechanical Components, Kinematic Mounts"available online at http://www.newport.com/Support/Tutorials/OptoMech/om3.asp, Copyright ©1996–2002, Newport Corporation.

* cited by examiner

Primary Examiner—Zandra V. Smith
(74) Attorney, Agent, or Firm—JDI Patent; Joshua D. Isenberg

(57) ABSTRACT

Methods and apparatus for aligning a lens with respect to an axis of beam propagation are disclosed. A position of the lens is adjusted with respect to the axis along one or more directions that lie substantially parallel to a surface of a bulkhead connector. The surface of the bulkhead connector is substantially not parallel to the axis of beam propagation. A position of the lens is adjusted along a direction substantially parallel to the axis of beam propagation. After adjustment, the position of the lens is fixed with respect to the surface. An example of a lens aligning apparatus includes a lens mount configured to receive the lens, a bulkhead connector having a surface, wherein the axis of beam propagation intersects a plane of the surface, means for fixing a position of the lens mount with respect to the surface; and means for fixing a position of the lens with respect to the lens mount.

35 Claims, 6 Drawing Sheets

ALIGNING A LENS WITH RESPECT TO AN AXIS OF BEAM PROPAGATION

FIELD OF THE INVENTION

This invention generally relates to optics and more particularly to aligning a lens with respect to an axis of beam propagation.

BACKGROUND OF THE INVENTION

Fiber bulkhead couplers are often used when coupling an optical fiber to an optical device. Such bulkhead couplers often include a collimating lens that must be aligned with respect to an axis of beam propagation to or from a fiber. There are many styles of fiber bulkhead design, however they each suffer from drawbacks that make them less than ideal for applications such as fiber coupled lasers. For example, in a pigtail coupler a fiber is coupled into a ferrule and held in place (typically inside of a sealed laser system). Unfortunately the fiber is not removable. Sealing around this design is typically a permanent adhesive solution. Strain relieving the fiber from the mounting system becomes difficult and misalignment is a common problem. Pigtail couplers typically require special handling and assembly and are not "off-the-shelf". One alternative fiber coupler is known as an adjustable bulkhead. Such connections are particularly desirable where a collimating lens is required between a fiber and some optical component of a laser or high-power optics. This type of device is a sealed, fiber coupled bulkhead connection with the ability to adjust a collimator lens using some fine pitch (0–80) screws. The spring force for the design is provided by the sealing mechanism—an o-ring. Unfortunately, O-rings are not ideal for holding a micron-level tolerance over time, and this mount is known to drift and be highly imprecise. This type of fiber mount needs to continuously be adjusted through its lifetime, making it an impractical solution for an OEM laser. Although the fiber is removable, the very removal and replacement of the fiber will cause the mount to move, misaligning the system.

Another alternative fiber coupler uses a fixed lens. High precision machining is possible, as are ultra precision optics. It is possible to design a system where a counterbore is precisely located in position and depth in relation to the fiber face. The lens is typically held in a machined bore with adhesive, thereby forming a seal to the outside world. Unfortunately, such a design is expensive to implement. Machining tolerances are exceptionally tight and fundamentally limit the precision of the system. Physical optical tolerances must be excellent, especially in regards to centration. Such tolerances are typically only found and understood in a mass manufactured system, where special tooling has been created to guarantee specifications. Off-the-shelf and low-volume solutions currently on the market are limited in their range of optics and coupling capabilities, and are typically low power solutions only. Effectively, this approach only allows for adjustment in the Z-axis. As used herein, the term "Z-Axis" refers to an axis of beam propagation. The terms "X-Axis" & "Y-Axis" refer to axes that are in a plane perpendicular to the axis of beam propagation.

Many prior art fiber coupling solutions are related to telecommunications. However, manufacturers of precisely aligned and affixed solid-state lasers often have a set of requirements specific to their industry. For example tolerances are tighter in the laser and high-power optics industry than in the telecommunications industry. The very best machined tolerances tend to be on the order of 10 microns. Optical alignments in the laser and high-powered optics industry can be on the order of less than 1 µm. It is impossible to achieve these tolerances with mechanical (i.e. bolts/snaps/references) fixturing alone. Optics must be individually aligned and carefully affixed using a low/non-shrinking adhesive. Solder is occasionally used, but tends to creep or move as it solidifies, and continues to move as the residual stresses relieve themselves.

In addition, long term alignment is critical to the lifetime performance of high-powered lasers and optics. As such, methods that might creep, or retain residual stress are undesirable. Plastics are also undesirable for long term stability. Many laser and high-power optics applications require optical alignments that can maintain tolerances of less than 10 microradians over 40,000 hours of on/off operation. In addition, many lasers and high-power optics are not meant to be "re-tweaked" into position once they have left the factory.

Additional concerns that are not normally found in the telecommunications industry include cleanliness, sealing, thermal insensitivity, and volume. Cleanliness is essential to higher power devices. Most plastics and fixturing methods are not suitable, as they tend to outgas (and fog sensitive optics) causing failure. Sealing typically means more than a simple dust seal. Laser and high-power optics manufacturers often attempt to hermetically seal their packages for reliability. When the fiber connector is removed, the internal optics and system must still be protected. Thermal insensitivity refers to the use of materials with similar coefficients of thermal expansion (CTE) is key for reliable operation. Most plastics have CTE's that are 10 times greater than metals most commonly used in lasers and high power-optics. Finally, most segments of the laser and high-power optics industry, such as the OEM solid-state laser industry, are not high-volume businesses. Consequently, solutions that can be manufactured with typical means and tolerances are desirable. Solutions that allow for the unpredictability of custom optics are also desirable. A solution that uses off-the-shelf connectors is desirable.

Most prior art solutions are related to telecommunications applications that involve low optical power. Most do not mention any method of affixing, and this is a key element of any precision alignment. A majority of the prior art fiber connections are not removable and most are not bulkhead connections. In addition, most are not collimating solutions. Furthermore, most are fiber to fiber only, which limits the use of the connector to coupling between two fibers having the same OD and/or same Numerical Aperture. Cleanliness (outgassing) on a majority of the prior art would be prohibitive for higher powers and long term stability is highly questionable on most.

For example, U.S. Pat. No. 5,857,054 discloses an "Apparatus and Method for Removably Positioning Optical Fiber to Circuit Board Component In Enclosure." This apparatus is used to align fiber to a detector of large surface area. The tolerances described are an order of magnitude greater than is desirable in many laser and high-power optics applications. The fiber is aligned via a molded in or machined boss, which does not provide as precise an alignment as is often desired. Furthermore, the apparatus does not truly seal, does not allow for alignment in X & Y, and is not designed for coupling light from one fiber to another. In addition, the design is complex and predominately made using plastic. Thus, there are many thermal expansion issues.

U.S. Pat. No. 4,741,591 describes an "Optical Fiber Connector." This design relies on heat to cure. This is likely to damage coatings used in many laser and high-power optics applications. This design is for a fiber to fiber connection with zero gap only. This would not work for coupling fibers with different diameters or numerical apertures (NA) together. This design does not allow for any Z-axis adjustment. The X & Y adjustment in this design relies on the deformation of a metal part. This would likely have a "spring back" force and be hard to calibrate. In addition, this design requires an elaborate fixture and complex/precise machined parts. Furthermore this design does not seal, is not removable, and is not a bulkhead connector. In addition, this design uses solder, which is notorious for creep and strain. The design also calls for a face-touching contact, which is bad for polished optical surfaces.

U.S. Pat. No. 4,925,265 describes an "Apparatus for Directing a Laser Beam into Optical Fibers." Unfortunately, this design is not applicable for high power. The fiber connector is not truly sealed. When the connector is removed, optical elements inside are exposed to the environment. Furthermore, the design does not facilitate easy alignment.

U.S. Pat. Nos. 4,666,241, 4,741,590, and 4,614,402 describe a fiber optic connector and method for terminating fiber optic transmission members. These connectors and methods are fiber to fiber only with no means of simple disconnection or reconnecting. Although the design is simple, it is a specialized fiber termination and is not a bulkhead connector. Such a design is not likely to work with different diameters or Numerical Apertures.

U.S. Pat. No. 4,606,603 describes an "Underwater Connector Including Integral Bladder and Seal with Set of Constricting Means." This is a fiber to fiber connection wherein each fiber has the same diameter and NA. Alignment requires special compression in cylindrical member. The connection is complex, which is not appropriate for small volume manufacturing. The connection requires an index-matching fluid, which is incompatible with many high-power solutions. The index-matching fluid may also change over time.

U.S. Pat. No. 4,925,267 describes a "Structure and Fabrication of Components for Connecting Optical Fibers." In this design a lens is molded into a tube. This does not allow for coating or polishing the lens. The lens is plastic, which is not compatible with many high-power applications. The lens forming process limits surface quality. The design does not allow for beam sampling between fiber faces and it is not clear whether the connection is disonnectable.

U.S. Pat. No. 5,671,311 describes a "Sealed Multiposition Fiber Optic Connector. This is a low-power solution that uses plastic and relies on ultrasonic welding for fixturing. Alignment is based on a machined/molded boss, not "optical level" tolerances. Each fiber is not disconnectable. Furthermore, the solution is too complex for use with a single fiber.

U.S. Pat. No. 5,700,084 discloses an "Optical Source Position Adjustment Device." This is a method for aligning an optical source using a feedback loop. This method does not include or describe a method for affixing the optical source. This method also does not affix the optical source in permanent relation to other optics (it is in relation to reference optics only). Furthermore, this method does not provide for a bulkhead connector or repeatable insertion.

U.S. Pat. No. 5,737,349 is directed to an "Optical Isolator and Alignment." The alignment of an output polarizer is not really a "piston mount", as the metal output tube is referenced directly to the face and the polarizer is attached to that. Since it is not necessary for a polarizer, the mount does not provide for translation of the polarizer along the Z-Axis and only allows the polarizer to rotate about the Z-Axis. The required translational tolerances on such an optic are very coarse.

Published European Patent Application EP 1 189 241 A1 describes an "Underwater Maintenance Repair Device and Method." This device uses electromagnets to snug up a fiber connector to a mechanical reference. The electromagnets do not align the connector. Furthermore, any alignment that they do provide would fall apart as soon as electrical power is removed. The device is limited to mechanical level tolerances and it is not evident how this device continues to protect the optics when it is unplugged.

Published European Patent Application EP 1 195 630 A2 describes a "Fiber Optic Connector." Although this device is sealed and removable it does not allow for alignment along the Z-Axis. Furthermore, this device is a fiber to fiber interconnection only, requiring fibers with the same diameter, and same Numerical Aperture. In addition the design does not facilitate polishing the connector ends.

Thus, there is a need in the art, for a method and apparatus for aligning a lens with respect to an axis of beam propagation that overcomes the above disadvantages.

SUMMARY OF THE INVENTION

The above disadvantages are overcome by methods and apparatus for aligning a lens with respect to an axis of beam propagation. In an example of a method, a position of the lens is adjusted with respect to the axis along one or more directions that lie substantially parallel to a surface of a bulkhead connector. The surface of the bulkhead connector is substantially not parallel to the axis of beam propagation. The position of the lens can be adjusted along a direction substantially parallel to the axis of beam propagation and along both axes substantially perpendicular to the beam axis. Once adjusted the position of the lens is fixed with respect to the surface.

Such a method may be implemented with a suitable apparatus. An example of such an apparatus includes a lens mount configured to receive the lens, a bulkhead connector having a surface, wherein the axis of beam propagation intersects a plane of the surface, means for fixing a position of the lens mount with respect to the surface; and means for fixing a position of the lens with respect to the lens mount.

Embodiments of the method and apparatus provide certain advantages over the prior art. For example they provide the degrees of freedom to accommodate typical manufacturing irregularities. They allow for extremely precise optical alignment of a collimating fiber bulkhead connector. They may provide a seal to eliminate contamination worries as the fiber is disconnected. They may also provide a "blast shield" for higher power fiber ends, should a fiber "burn" or outgas.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. In the mathematical derivations described below certain assumptions have been made for the sake of clarity. These assumptions should not be construed as limitations on the invention. Accordingly, the exemplary embodiments of the invention described below are set forth without any loss of generality to, and without imposing limitations upon, the claimed invention.

Figure 1A:
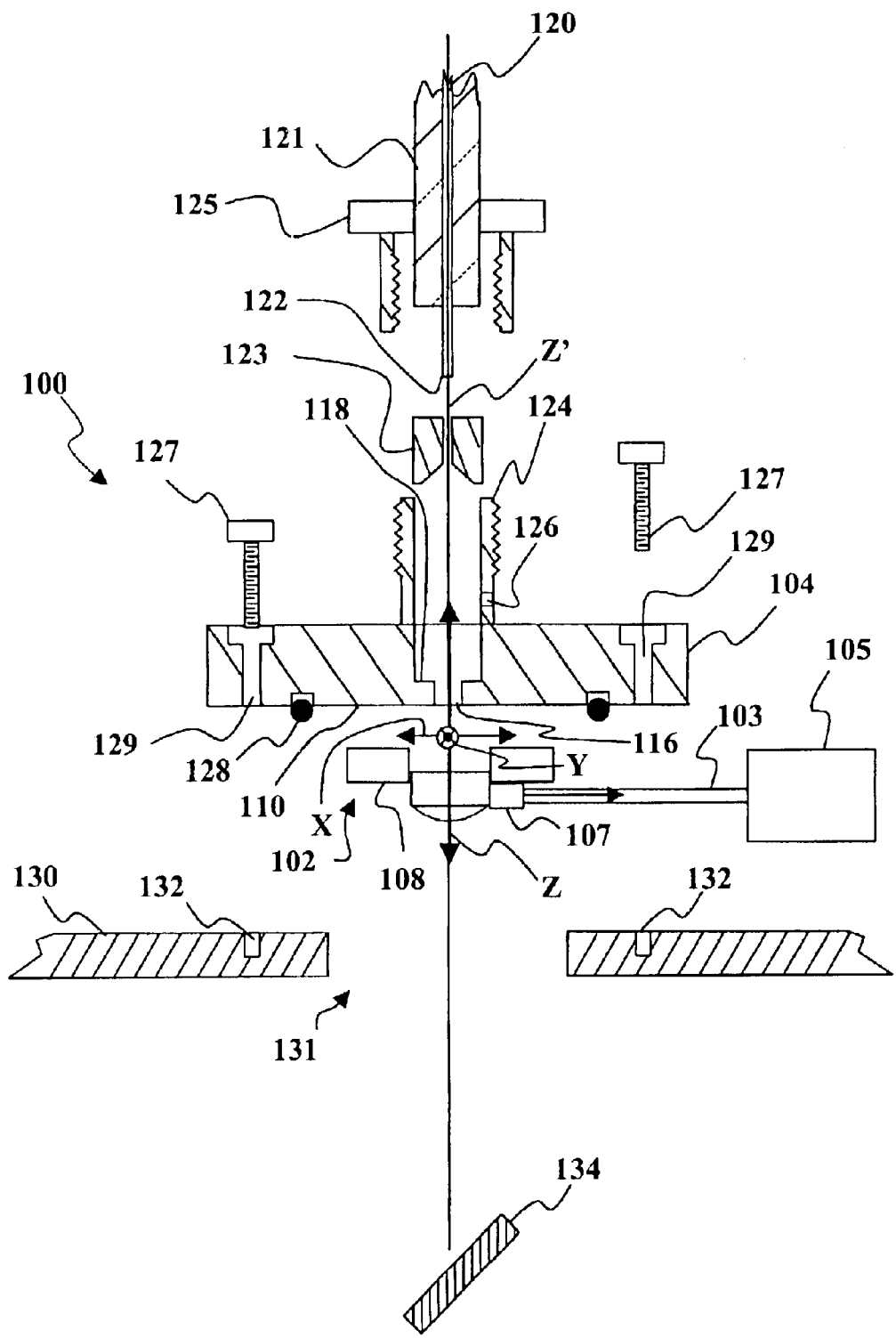
FIG. 1A shows an exploded cross-section of apparatus for aligning a lens with respect to an axis of beam propagation.
Figure 1B:
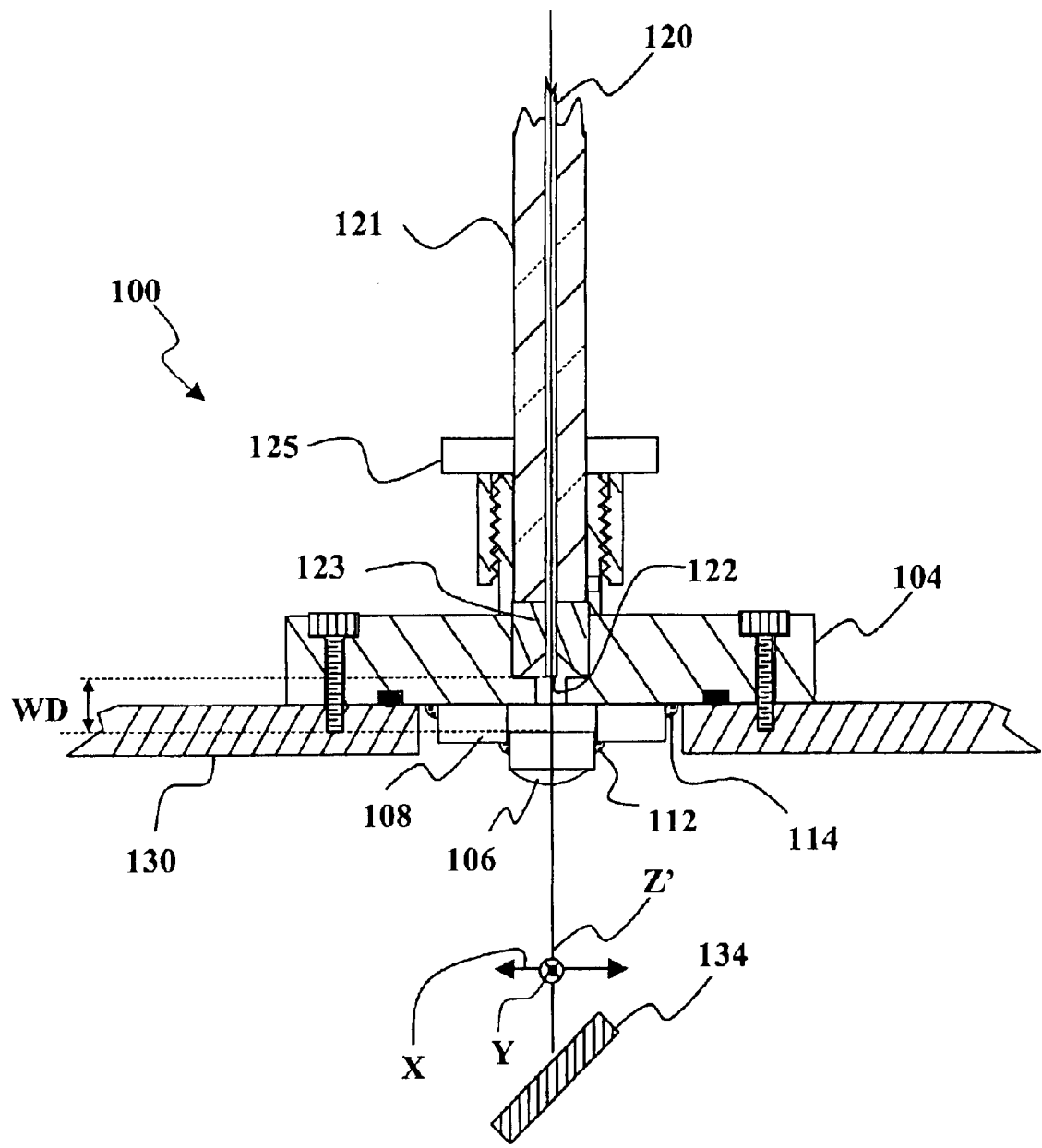
FIG. 1B shows a cross-sectional assembly of the apparatus of FIG. 1A.

FIGS. 1A–1B depict an example of an apparatus 100 for aligning a lens with respect to a beam propagation axis. The apparatus includes a mount 102 and a bulkhead connector 104. The mount 102 and bulkhead connector 104 are configured to align an optic axis of the lens Z with the axis of beam propagation Z'. The axis of beam propagation Z' may define a preferred path for coupling optical radiation to or from a component 134 of an optical apparatus 130. In the particular example shown in FIGS. 1A–1B the lens 106 is disposed between surface 110 of the bulkhead connector 104 and the component 134. Thus, the lens 104 may act as a "blast shield" for higher power fiber ends, should a fiber "burn". This configuration protects the components of the optical apparatus 130 from damage in the event of a fiber "burn."

The mount 102 is configured to receive a lens 106. In the example shown in FIGS. 1A–1B the mount 102 includes a ring 108 having an inside diameter that closely matches an outside diameter of the lens 106. The mount 102 allows for adjustment of a position of the lens 106 one or more directions that lie substantially parallel to a surface 110 of the bulkhead connector. In the particular example shown in FIGS. 1A–1B, the ring 108 allows for three degrees of adjustment freedom (e.g., translation along X, Y axes parallel to the surface 110 and translation along the optic axis Z, where the X and Z directions are in the plane of the drawing and the Y direction is perpendicular to the plane of the drawing) to position the lens 106. The mount 102 uses the ring 108 to create a face to align and fixate the lens 106 against a surface 110 of the bulkhead connector 104 so that the optic axis Z of the lens 106 may be aligned with respect to the axis of beam propagation Z'. The surface 110 of the bulkhead connector 104 is substantially not parallel to the axis of beam propagation Z'. In the example shown in FIGS. 1A–1B, the surface 110 is substantially perpendicular to the axis of beam propagation Z'. Because mount 102 allows for three degrees of freedom during the alignment of the lens 106, the typical errors associated with in mount and lens fabrication no longer limit the final alignment performance of the mount 102. The three degrees of freedom adjustment also allows the lens 106 to have looser centration and working distance tolerances. Although the ring may be made of any suitable material, it is often desirable to ensure a close match between the coefficient of thermal expansion (CTE) of the ring 108 and that of the lens 106. To this end it is preferable to make the ring 108 from a material, such as glass, having similar thermal expansion characteristics to the material of the lens 106. The mount 102 may alternatively include a tube in place of the ring 108 to allow for greater adjustment along the Z-axis. The difference between a ring and a tube is largely semantic. For example, a substantially cylindrical shaped object characterized by an inside diameter, an outside diameter and a length may be regarded as a tube if its length is greater than its outside diameter and a ring if its outside diameter is greater than its length. Furthermore, the mount 102 may include a side block in place of or in conjunction with the ring 108. Side block mounts are described in detail in commonly assigned U.S. Pat. Nos. 6,320,706 and 6,366,593. The disclosures of U.S. Pat. Nos. 6,320,706 and 6,366,593 are incorporated herein by reference.

The lens 106 may be fixed to the ring 108 and the ring 108 may be fixed to surface 110 by any suitable means. For, as shown in FIG. 1B example a fixating adhesive 112 may be placed at a joint between the lens 106 and the ring 108. Similarly, a fixating adhesive 114 may be placed at a joint between the ring 108 and the surface 110. The fixating adhesives 112, 114 may be placed at the appropriate joints in an uncured state. The position of the lens 106 may then be adjusted with respect to X-, Y- and Z-Axes to a desired position. For example, a vacuum chuck 103 coupled to a vacuum source 105 may hold the lens 106. The vacuum chuck 103 may move the lens 106 in the X-, Y-, and Z-directions to obtain the desired alignment. The vacuum chuck 103 may be connected to a conventional alignment stage (not shown) that provides the possibility for adjustments in the X-, Y- and Z-directions. The vacuum chuck 103 may have clamping member 107 that is contoured to match a curvature of a side of the lens 106. When the clamping member 107 is in sufficiently close proximity to the lens 106, the vacuum source 105 may evacuate a gap between the lens 106 and the clamping member 107. This produces a force that holds the lens 106 against the clamping member 107.

Some alternatives, among others, to the use of adhesives for fixing the positions of the lens 106 and ring 108 include optical welds, metallization followed by physical welding, mechanical fixation, e.g., using collets and set screws, soldering, or brazing. As used herein, physical welding may also include bonding optics with lye.

The adhesives 112, 114 may be applied in an uncured state to allow for adjustment of the position of lens 106. Once the lens 106 is in the desired position, the fixating adhesives 112, 114 may be cured to fix the lens 106 in place with respect to the axis of beam propagation. By way of example, the fixating adhesives 112, 114 may be UV-curing adhesives or thermal-curing adhesive. The fixating adhesives 112, 114 may be applied in amounts sufficient to tack the lens in place to fix the lens 106 in place after initial alignment. If so desired, the fixating adhesives 112, 114 can be reinforced with additional adhesives or sealants after the initial alignment and fixation to provide a hermetic seal between the lens 106 and the bulkhead connector 104. Although it is preferable to use an adhesive, the design functions equally well with other methods of fixation, including welding, thermal curing, catalyst curing to name a few examples.

The bulkhead connector 104 may be made from a metal such as 300 series stainless steel. The bulkhead connector 104 may include an aperture 116 that is configured to receive an optical fiber 120. The fiber 120 may be covered by a protective jacket 121. The bulkhead connector 104 may configured such that fiber 120 can be removed from and/or replaced in the aperture 116 without intruding on a seal between the lens 106 and the bulkhead connector 104. For example, the bulkhead connector 104 may include a fiber connector 124 to facilitate attachment and removal of the fiber 120. The fiber connector 124 may optionally include a hole 126 to accommodate outgassing from and relieve gas pressure on the fiber 120. One example, among others, of such a connector 124 may be configured to receive a corresponding connector that is attached to the fiber 120 proximate the end 122. The boss 124 may be configured to receive any type of fiber connector. Possible examples of fiber connector types include SMA, ST, FC, SC, Duplex and Biconic connectors. By way of example, the fiber connector 124 may be a threaded boss configured to receive an SMA-905 fiber connector.

As a practical matter an optical fiber is often received in ferrule to facilitate attachment to a fiber connector. Consequently, as used herein, the aperture 116 may be regarded as being "configured to receive" an optical fiber if the aperture 116 is sized and shaped to receive a ferrule 123 to that may receive a bare end 122 of the fiber 120. There are numerous designs of fiber ferrules that are well-known to those of skill in the art. Most involve a tightly toleranced, e.g., precision machined or precision ground, cylinder made of metal or ceramic. The cylinder typically has some portion with an inside diameter than closely matches an outside diameter of the bare fiber. In the example depicted in FIGS. 1A–1B the ferrule 123 has a cone-shaped endface. Alternatively, the ferrule 123 may be a simple cylinder having an inside diameter that matches an outside diameter of the fiber 120. The face of the end 122 of the fiber is coplanar with an end surface of the ferrule. The aperture 116 includes a lip 118 engages the end surface of the ferrule. The lip 118 restricts a forward movement of the ferrule 123 thereby fixing a working distance WD between the end 122 of the fiber 120 and the lens 106. The fiber 120 may be retained in the fiber connector 124 with conventional means such as a mating threaded fitting 125. The fiber 120 can be removed from and/or replaced in the aperture 116 without affecting the alignment of the lens 106 or intruding on a seal between the lens and the bulkhead connector or between the bulkhead connector and an optical apparatus 130.

Fibers are also often connected using a pigtail, e.g., a cylindrical glass ferrule having an inside diameter that matches the outside diameter of the bare fiber. The fiber may be secured to the sleeve by conventional means, such as an adhesive and the sleeve may be secured to the bulkhead connector 104 by conventional means such as an adhesive, removable adhesive, clamp or spring. Consequently, the aperture 116 may be regarded as being "configured to receive" an optical fiber if the aperture 116 has a size and shape that allow it to receive the glass ferrule of a fiber pigtail. Furthermore, it is possible, if somewhat unconventional, to form the aperture 116 with an inside diameter and shape that allow it to receive the bare end 122 of the fiber 120 directly. In such a case, the aperture 116 may be regarded as being "configured to receive" an optical fiber.

The bulkhead connector 104 may be configured to make a sealed connection to an opening 131 in a bulkhead (wall) of an optical apparatus 130. Such a seal may be implemented, e.g., using an o-ring 128. Conventional means such as, e.g., one or more screws 127 may be used to compress the o-ring 128 and releasably secure the bulkhead connector to the optical apparatus 130. Counterbored through-holes 129 in the bulkhead connector and tapped holes 132 in the optical apparatus 130 receive the screws 127. Alternatively, the bulkhead connector 130 may be integrally formed from or permanently attached to a wall of the optical apparatus 130. Furthermore, the bulkhead connector 104 may optionally be kinematically mounted (e.g., with first, second and third balls that are respectively received by a flat, groove and cone) during initial alignment so that it may be removed and replaced with a high degree of repeatability in the alignment of the lens 106 with respect to the optical apparatus 130. Alternatively, the bulkhead connector may be quasi-kinematically mounted, e.g., using balls or pins that are received by three intersecting grooves.

The lens to 106 may be aligned to the optical apparatus 130 may proceed in a number of different ways. For example, the lens 106 may be aligned with respect to a beam propagation axis Z' defined by a beam emerging from the fiber 120 and secured to the aligned bulkhead connector 104. The bulkhead connector 104 may then be mounted (e.g., semi-permanently) to the wall of the optical apparatus 130. The optical elements, e.g. 134 that are internal to the optical apparatus 130 may then be aligned with respect to the lens 106 and the axis of beam propagation Z'. Should the bulkhead connector 104 need to be replaced the, it may be removed and replaced with a new one, e.g., having a new lens. The internal optical elements may typically be re-aligned with respect to the new bulkhead connector and lens. This order of alignment works well, e.g., when optical radiation is to be coupled into the apparatus 130, e.g., from the fiber 120

In some applications, such as when optical radiation is to be coupled from the optical apparatus 130, e.g., into the fiber 120, it may be more practical to align the internal optical elements of the apparatus 130 first to define the axis of beam propagation Z'. The lens 106 can then be aligned with respect to the axis of beam propagation Z'. Furthermore, it is possible to align the lens 106 with respect to an axis of beam propagation defined by a free-space beam that originates either inside or outside the optical apparatus 130.

Because of the ability to adjust the position of the lens 106, the machining tolerance on the design of FIGS. 1A–1B may be relatively loose, e.g., about 0.010" to about 0.020" in the Z direction Remarkable as it sounds, the inventors have found this to be true if the lenses are within specification. The concentricity of the aperture 116 with respect to an SMA connector may typically be about d/30, and may be as much as d/8, where d is the outside diameter of the lens 106. Such loose tolerances coupled with the nature of the design allow the use of a variety an "off-the-shelf" lenses 106. Such a lens 106 may initially have an outside diameter d that is greater than an inside diameter (ID) of the ring 108. The outside diameter d of the lens 106 may be ground to fit into the ring 108. This is a relatively simple task that may be done by an optician or machine shop. An adapter may also be manufactured to accommodate differences in lens outside diameter and ring inside diameter. The design of the apparatus 100 also accommodates use with a variety of coupling schemes without affecting the layout of the optical apparatus 130.

The nature of the design of the apparatus 100 of the type shown in FIGS. 1A–1B allows it to work with low-volume (e.g. laser) production schemes. The nature of the design also allows for an extremely wide range of optics and collimation schemes and fiber connection options-this is ideal for both engineering a design and manufacturing a design with standard parts. Finally, in the preferred embodiment, the working distance (from lens to fiber) can change without affecting the layout of optical components of the apparatus to which the fiber is being coupled. The design of the apparatus meets all the above requirements particularly with respect to tolerances and long term stability. It can be made to be clean and provide a good seal. It is fairly insensitive to temperature and power levels. It can be manufactured using low (and high) volume techniques without exceedingly tight manufacturing specifications. Importantly, it allows for the collimation of fibers of various numerical apertures. This in turn allows for the coupling of fibers of different diameter or Numerical Aperture. Because of the precise collimation, a fiber interconnection can be spaced and allow for a beam pickoff or sampling between the fiber faces. It does not require complicated tooling to manufacture and align. It has the 3 required degrees of freedom to attain alignment for situations where rotations about X and Y are not needed. Rotation about Z is possible, with the apparatus although in many applications it is not used. Where adhesives with some thickness capabilities are used it is possible to get about +/−1 degree of rotation of the lens 106 about the X or Y axis. This is typically not done, as translation about the optical axis accomplishes the same thing with minimal distortion. With a lens-collimation, if the optical axis Z' of the lens 106 is substantially parallel to it's mechanical axis, rotation of the lens about the X or Y axis is simply not necessary. The amount of distortion introduced by steering the beam slightly through the lens is so low as not to affect coupling efficiency. The fiber may be connected, disconnected and reconnected with a standard fiber connector. If the apparatus 130 is a laser, the fiber 120 may be an output fiber. Where a free space beam is desired, the apparatus 100 may be removed and replaced with a window. The apparatus 100 achieves the same level of alignment tolerance and variation as the standard fiber connector. In the case of, e.g., an FC connector, the losses associated with connector variation are typically as low as 0.15 dB. For a 125 µm fiber, his can be <5 µm variation and repeatability from connector to connector.

Figures 2A, 2B:
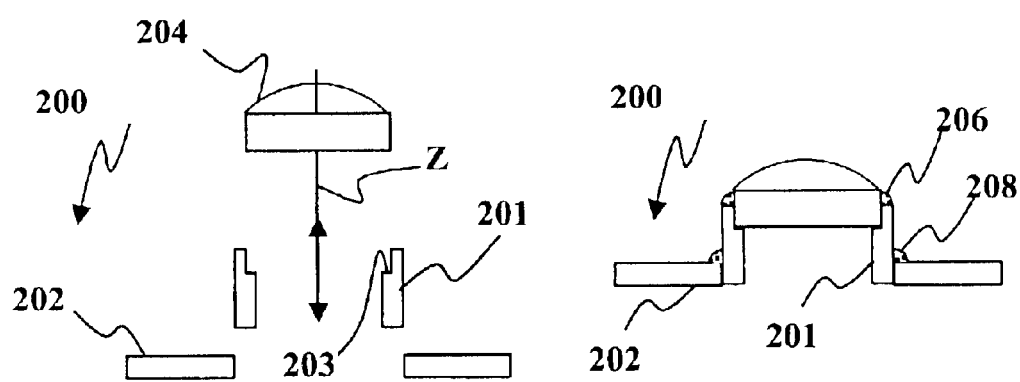
FIG. 2A shows an exploded cross-sectional view of an alternative lens mount that may be used with the apparatus of FIG. 1.
FIG. 2B shows a cross-sectional assembly of the lens mount of FIG. 2A.

The design shown in FIGS. 1A–1B may be varied without departing from the scope of the present invention. For example, FIGS. 2A–2B depict an alternative mount 200 that may be used in place of the ring 108 shown in FIGS. 1A–1B. The mount 200 has a piston 201 and a ring 202 that allow for three degrees of freedom for adjusting the position of an optical element, such as a lens 204. The mount 200 uses the piston 201 and ring 202 to create a face to align and fixate the lens 204 so that an optic axis Z" of the lens 204 may be aligned with respect to an axis of beam propagation. Because mount 200 allows for three degrees of freedom during the alignment of the lens 204, the typical errors associated with mount and lens fabrication no longer limit the final alignment performance of the mount 200. The three degrees of freedom adjustment also allow the lens 204 to have looser centration and working distance tolerances. Furthermore, the mount 200 may include a side-block in place of or in conjunction with the ring 202.

The piston 201 may include a step 203 that receives the lens 204. The lens 204 may be secured to the piston 201 and the piston 201 may be secured to the ring 202 by any suitable means. For example fixating adhesives 206 may be placed at a joint between the lens 204 and the piston 201. Similarly, a fixating adhesive 208 may be placed at a joint between the piston 201 and the ring 202. Another adhesive may be used to fix the ring 202 to a bulkhead connector in a manner similar to that described above with respect to FIGS. 1A–1B. As in the example of FIGS. 1A–1B it is often desirable to make the piston 201 and ring 202 from materials having thermal expansion properties that are similar to those of the lens 204. In addition is often desirable to use a quick-curing low outgassing adhesive.

The apparatus described above may also be configured to couple two fibers of different diameters and/or different numerical apertures in a device referred to herein as a junction box.

Figure 3A:
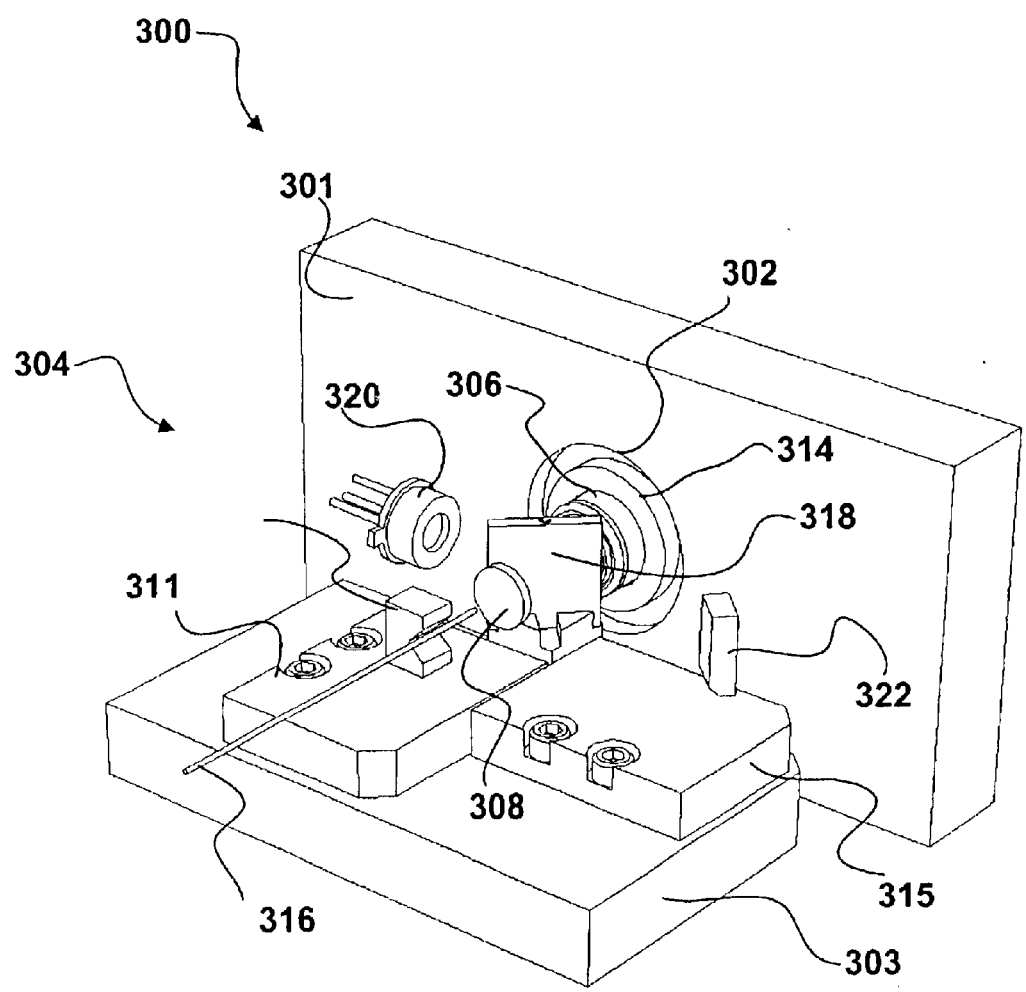
FIG. 3A depicts an isometric view of a junction box.
Figure 3B:
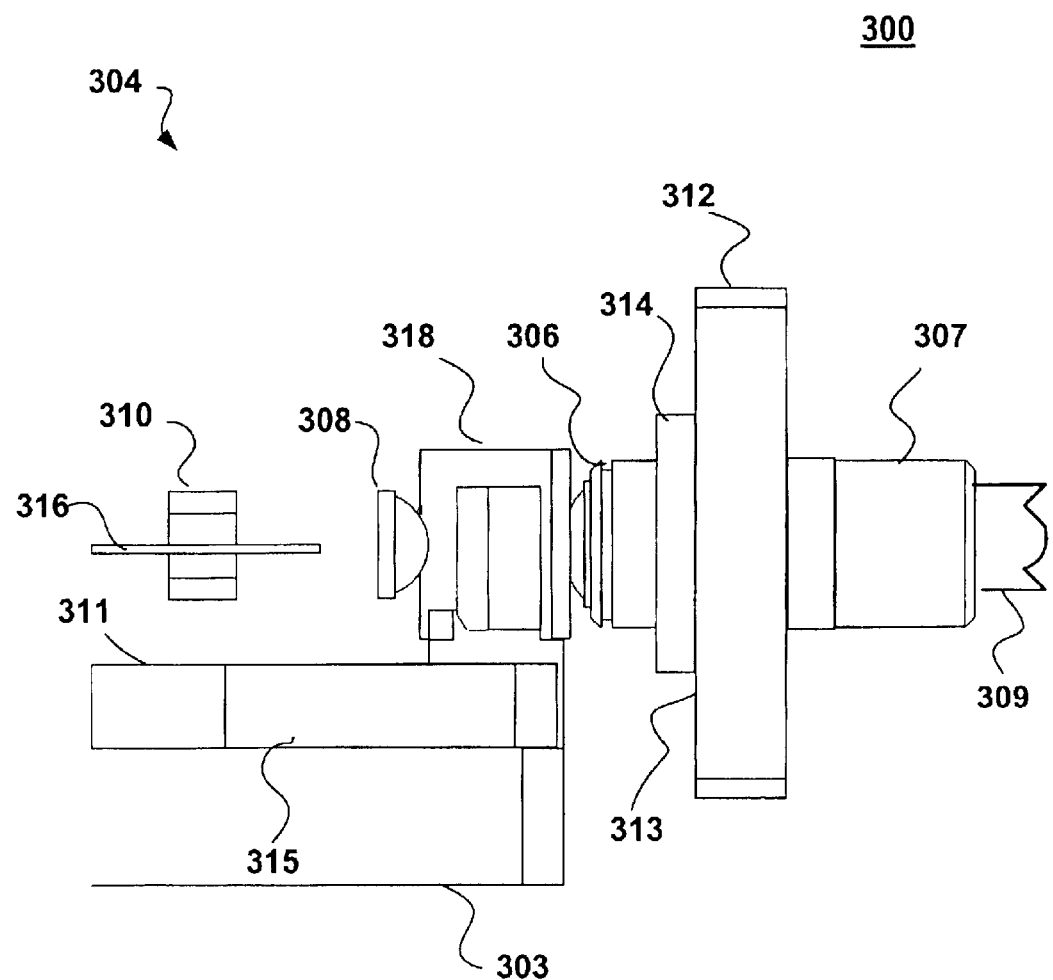
FIG. 3B depicts a side elevation of the junction box of FIG. 3A.
Figure 3C:
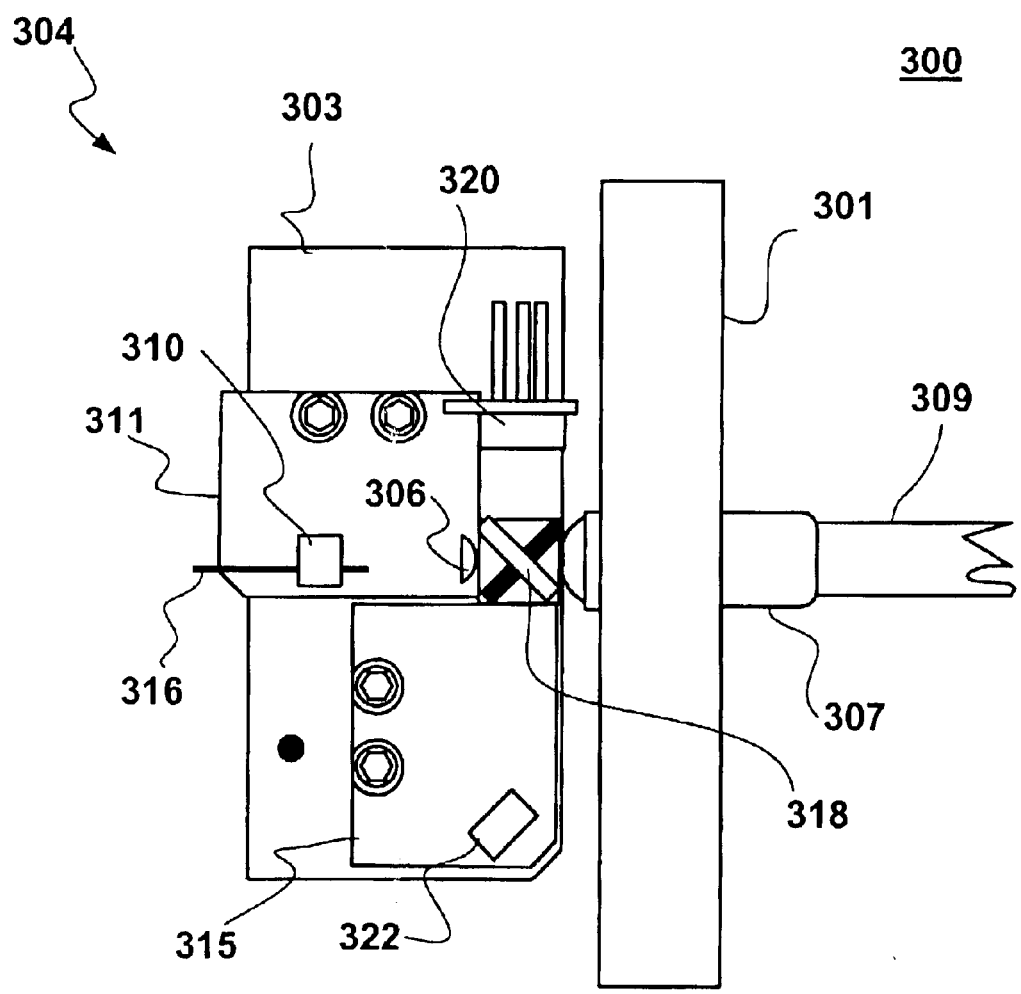
FIG. 3C depicts a top plan view of the junction box of FIGS. 3A–3B.

FIGS. 3A–3C show an example of a junction box 300 based on the apparatus of FIGS. 1A–1B. The junction box 300 includes one or more walls such as a first and second wall 301, 303, an apparatus 304 that aligns a first lens 306, a second lens 308 and a fiber mount 310. By way of example, the first wall 301 may include an opening 302. Although the junction box 300 is depicted as having two walls, the function of these two walls may alternatively be formed from an integral piece. Furthermore, the junction box 300 may have additional walls to enclose the lenses 306, 308 and the fiber mount 310. In FIG. 3B the first wall 301 has been removed to expose the details of the apparatus 304. The opening 302 receives the apparatus 304, which may include a bulkhead connector 312 and ring 314 having features similar to those described above with respect to FIGS. 1A–1B. The ring 314 provides a face that allows for adjustment of the position the first lens 306 in three dimensions with respect to a surface 313 of the bulkhead connector 312. Optionally, a ring and piston mount of the type shown in FIGS. 2A–2B may be used to align the first lens 306. The first lens 306 is set at a known working distance from the end of a first optical fiber 309 to collimate light traveling from the fiber to the lens and/or to focus collimated light into the fiber.

The second lens 308 is mounted between the fiber mount 310 and the first lens 306. The fiber mount 310 may hold a second optical fiber 316. By way of example, the fiber mount 310 may be a V-groove mount. The second lens 308 focuses collimated light into the second optical fiber 316 and/or collimates light from the second optical fiber 316. With this junction box design, the first and second fibers 309, 316 may have different diameters and/or different numerical apertures. The second lens 308 may be attached to a removable mounting plate 311 and positioned and aligned with respect to the axis of beam propagation Z'" by any suitable lens mount. Such lens mounts include solder mounts, ball and socket mounts, and side block mounts. Preferably, the second lens 308 is mounted to the second wall 303 using a side block mount. As stated above, side block mounts are described in detail in commonly assigned U.S. Pat. Nos. 6,320,706 and 6,366,593, the disclosures of which have been incorporated herein by reference. Alternatively, the second lens 308 may be mounted to a bulkhead connector similar to the bulkhead connector 312.

Using off-the-shelf, readily available, optics, a junction box of the type shown in FIGS. 3A–3C can achieve a magnification (or demagnification) ratio of 3:1. By way of example, the first fiber 309 may be a 200 µm multimode fiber and the second fiber 316 may be a 66 µm multimode fiber. A greater ratio may be achieved with custom optics or decreased coupling efficiency.

Using properly coated optics, junction boxes of the type shown in FIGS. 3A–3C have regularly achieved coupling efficiencies between 90 and 95% of the theoretical limit. In order to achieve these coupling efficiencies, it is important to keep the first and second lenses 306, 308 as close together as possible. Preferably, the distance between the lenses should be less than (F1+F2) where "F1" and "F2" are respectively the focal lengths of the first and second lenses 306, 308.

Light traveling from the first fiber 309 to the second fiber 316 or vice versa is substantially collimated in the space between the first and second lenses 306, 308. The space between the first and second lenses 306, 308 may be made large enough to accommodate a beam-sampling element 318. The beam-sampling element intercepts a portion of the collimated light and redirects it. Examples of beam-sampling elements include dichroic mirrors, beamsplitters, half-silvered mirrors, and the like. The beam-sampling element 318 may direct a portion of the intercepted beam to some other optical element. Such optical elements may include, but are not limited to, lenses, mirrors, photodetectors, and polarizers. In the example shown in FIGS. 3A–3C, the beam sampling element 318 is a dichroic mirror that directs a portion of light traveling from the first fiber 309 to the second fiber 316 towards a photodetector 320. The beam-sampling element also directs a portion of light traveling from the second fiber 316 to the first fiber 309 toward a mirror 322. The mirror 322 may be attached to a removable mounting plate 315. The beam sampling element 318 and mirror 322 may be positioned and aligned in any suitable manner, e.g., in any of the ways described above with respect to mounting the second lens 308, with side block mounts being preferred.

The approaches described above have provided proven and elegant solutions to complex problems. This approach has worked very well and has proven to be adaptable for various working distances and fiber coupling schemes. The design has achieved high coupling efficiencies and excellent repeatability (within the tolerance of the fiber connector itself). [This approach also allows the ability to interchange between both free-space and fiber coupled versions while also being able to accommodate single and multi-mode fibers.]

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. The appended claims are not to be interpreted as including means-plus-function limitations, unless such a limitation is explicitly recited in a given claim using the phrase "means for."

What is claimed is:

1. A method for aligning a lens with respect to an axis of beam propagation, comprising:

adjusting a position of the lens with respect to the axis along one or more directions that lie substantially parallel to a surface of a bulkhead connector, wherein the surface of the bulkhead connector is substantially not parallel to the axis of beam propagation;

adjusting a position of the lens along a direction substantially parallel to the axis of beam propagation;

fixing the position of the lens with respect to the surface; and releasably attaching the bulkhead connector to an optical apparatus.

2. The method of claim 1 wherein the lens is disposed between surface of the bulkhead connector and a component of the optical apparatus.

3. The method of claim 1 wherein the surface of the bulkhead is substantially perpendicular to the axis of beam propagation.

4. The method of claim 1 wherein adjusting a position of the lens includes disposing the lens in a mount.

5. The method of claim 4 wherein fixing the position of the lens includes securing the lens to the mount with one or more of the following: optical welding, lye bonding, metallization followed by physical welding, mechanical fixation, using collets and set screws, soldering, brazing or an adhesive.

6. The method of claim 4 wherein fixing the position of the lens includes securing the lens to the mount with a UV-curing adhesive.

7. The method of claim 4 wherein fixing the position of the lens includes securing the lens to the mount with a thermal-curing adhesive.

8. The method of claim 4 wherein fixing the position of the lens includes securing the mount to the surface of the bulkhead with one or more of the following:

optical welding, optical welding, lye bonding, metallization followed by physical welding, mechanical fixation, using collets and set screws, soldering, brazing or an adhesive.

9. The method of claim 4 wherein fixing the position of the lens includes securing the mount to the surface of the bulkhead with a UV-curing adhesive.

10. The method of claim 4 wherein fixing the position of the lens includes securing the mount to the surface of the bulkhead with a thermal-curing adhesive.

11. An apparatus for aligning a lens with respect to an axis of beam propagation, comprising:

a lens mount configured to receive the lens, a bulkhead connector having a surface, wherein the axis of beam propagation intersects a plane of the surface, wherein the bulkhead connector is releasably attachable to an optical apparatus;

means for fixing a position of the lens mount with respect to the surface; and means for fixing a position of the lens with respect to the lens mount.

12. The apparatus of claim 11 wherein the lens mount and bulkhead connector are configured to align an optic axis of the lens with the axis of beam propagation.

13. The apparatus of claim 11 wherein the lens mount and bulkhead connector are configured to adjust a position of the lens along the axis of beam propagation.

14. The apparatus of claim 13 wherein the lens mount and bulkhead connector are configured to align an optic axis of the lens with the axis of beam propagation.

15. The apparatus of claim 11 wherein the lens mount is configured to allow adjustment of a position of the lens in one or more degrees of freedom.

16. The apparatus of claim 15 wherein the one or more degrees of freedom include translation along one or more directions that lie substantially parallel to a surface of the bulkhead connector and translation along a direction substantially parallel to the axis of beam propagation.

17. The apparatus of claim 11 wherein the surface of the bulkhead connector is substantially not parallel to the axis of beam propagation.

18. The apparatus of claim 11 wherein the lens mount includes a ring configured to receive the lens.

19. The apparatus of claim 11 further comprising means for releasably attaching the bulkhead connector to an optical apparatus.

20. The apparatus of claim 19 wherein the means for releasably attaching includes one or more screws sized to fit through one or more corresponding through-holes in the bulkhead connector.

21. The apparatus of claim 20 wherein the means of referencing includes kinematic mounting.

22. The apparatus of claim 20 further comprising means for sealing the bulkhead connector to the optical apparatus.

23. The apparatus of claim 20 wherein the means for sealing includes an o-ring.

24. The apparatus of claim 15 wherein one of the three or more degrees of freedom includes rotation about an axis that is substantially parallel to the axis of beam propagation.

25. The method of claim 1, further comprising securing an end of an optical fiber within the bulkhead connector at a fixed distance from the lens.

26. An apparatus for aligning a lens with respect to an axis of beam propagation, comprising:
   a lens mount configured to receive the lens, wherein the lens mount includes a piston configured to receive the lens and a ring configured to receive the piston,
   a bulkhead connector having a surface, wherein the axis of beam propagation intersects a plane of the surface;
   means for fixing a position of the lens mount with respect to the surface; and
   means for fixing a position of the lens with respect to the lens mount.

27. An apparatus for aligning a lens with respect to an axis of beam propagation, comprising:
   a lens mount configured to receive the lens,
   a bulkhead connector having a surface, wherein the axis of beam propagation intersects a plane of the surface, wherein the bulkhead connector includes an aperture that intersects the surface of the bulkhead connector, wherein the aperture is substantially aligned with the beam propagation axis, wherein the aperture is configured to receive an optical fiber, wherein the aperture includes a lip that restricts movement of the fiber towards the lens;
   means for fixing a position of the lens mount with respect to the surface; and
   means for fixing a position of the lens with respect to the lens mount.

28. The apparatus of claim 27 wherein fiber can be removed from and/or replaced in the aperture without substantially affecting an alignment of the lens with respect to the beam propagation axis.

29. The apparatus of claim 27 wherein the bulkhead connector is configured such that fiber can be removed from and/or replaced in the aperture without intruding on a seal between the lens and the bulkhead connector.

30. The apparatus of claim 27 wherein the bulkhead connector includes a fiber connector configured to receive a corresponding connector attached to a fiber.

31. The apparatus of claim 30 wherein the fiber connector is chosen from the group consisting of SMA, ST, FC, SC, Duplex and Biconic connectors.

32. An apparatus for aligning a lens with respect to an axis of beam propagation, comprising:
   a lens mount configured to receive the lens,
   a bulkhead connector having a surface, wherein the axis of beam propagation intersects a plane of the surface;
   means for fixing a position of the lens mount with respect to the surface; and
   means for fixing a position of the lens with respect to the lens mount;
   a second lens having an optic axis aligned with the axis of beam propagation; and
   a beam sampling element disposed between the lens and the second lens.

33. The apparatus of claim 32 wherein the lens and the second lens are configured to collimate light traveling between two optical fibers having different diameters and/or different numerical apertures.

34. The apparatus of claim 32 further comprising means for aligning an optical fiber with the axis of beam propagation, wherein the second lens is disposed between the lens and the optical fiber aligning means.

35. An apparatus for aligning a lens with respect to an axis of beam propagation, comprising:
   means for adjusting a position of the lens with respect to the axis along one or more directions that lie substantially parallel to a surface of a bulkhead connector;
   means for adjusting a position of the lens along a direction substantially parallel to the axis of beam propagation;
   means for fixing the position of the lens with respect to the surface; and
   means for releasably attaching the bulkhead connector to an optical apparatus.

* * * * *